5/15/84 XR 4,449,134

United States Patent [19]

Skinner, Jr.

[11] 4,449,134

[45] May 15, 1984

[54] COMPOSITE INK JET DRIVERS

[75] Inventor: Doyle P. Skinner, Jr., Pittsford, N.Y.

[73] Assignee: Xerox Corporation, Stamford, Conn.

[21] Appl. No.: 369,683

[22] Filed: Apr. 19, 1982

[51] Int. Cl.³ .................. G01D 15/18

[52] U.S. Cl. .................. 346/75; 29/25.35; 310/800; 346/140 R

[58] Field of Search .................. 346/75, 140; 310/800, 310/358, 357; 29/25.35; 252/62.9

[56] References Cited

U.S. PATENT DOCUMENTS

| | | | |
|---|---|---|---|
| 2,420,864 | 5/1947 | Chilowsky | 29/25.35 |
| 3,940,637 | 2/1976 | Ohigashi | 310/800 X |
| 4,227,111 | 10/1980 | Cross | 310/358 |
| 4,282,532 | 8/1981 | Markham | 346/75 |
| 4,296,417 | 10/1981 | Markham et al. | 346/75 |
| 4,330,593 | 5/1982 | Shroot | 252/62.9 X |
| 4,405,402 | 9/1983 | Quilliam | 29/25.35 X |
| 4,407,054 | 10/1983 | Zipfel | 29/25.35 |

OTHER PUBLICATIONS

"Piezoelectric Properties in the Composite Systems of Polymers and PZT Ceramics"; Publ. in the J. Appl. Phys., vol. 50, No. 7, Jul. 1979 by T. Furukawa et al.

"Flexible Piezoelectric Organic Composites", Publ. for Proceedings of the Workshop on Sonar Transducers Mtls. at Naval Research Lab., p. 251, Nov. 1975.

"Polypropylene Filled with Barium Titanate: Dielectric & Mech. Properties by S. Dasgupta, J. of Appl. Polymer Science, vol. 22; pp. 2283–2286, (1978).

*Primary Examiner*—Joseph W. Hartary

*Attorney, Agent, or Firm*—Robert A. Chittum; Stephen J. Schultz

[57] ABSTRACT

An ink jet droplet exciter for generating pressure waves in a droplet generator. The preferred exciter is a composite made of PZT, Pb (Zr:Ti) $O_3$, and a polyethylene supporting material. The mean diameter of the PZT particles is 7 mils and the entire exciter thickness is between 10 and 12 mils. The composite is pliable and can be made in sheets of a large enough area to provide droplet excitation for a multiple nozzle generator.

8 Claims, 5 Drawing Figures

COMPOSITE INK JET DRIVERS

BACKGROUND OF THE INVENTION

1. Field of the Invention

The present invention relates to ink jet printing and more particularly to an improved droplet exciter used in continuous or Rayleigh-type ink jet printers.

2. Prior Art

A variety of ink jet printing architectures are known in the art. Each of these architectures can be used to selectively encode a recording member such as paper or the like with patterns of ink droplets in a controlled manner. So called drop on demand printing, for example, is practiced by causing a recording member to pass in the vicinity of a printer from which ink droplets are generated only at specified intervals. While the so called drop on demand type printing has certain advantages, most specifically the simplicity of design of the ink jet printer, it is questionnable if drop on demand type printers can achieve speed and resolution requirements deemed necessary for a high quality printer.

A second type of ink jet printing is so called continuous type printing wherein ink droplets are continuously generated by a drop generator but wherein only selected ones of those generated drops strike the recording member. Each known type of continuous printer presently employs some type of gutter or catching mechanism to intercept droplets as they proceed toward the print medium to allow a pattern to be created on that medium. The continuous type printer operates due to the phenomenon, first recognized by Lord Raleigh, that when a liquid column is squirted through an orifice, the liquid breaks up into individual droplets due to surface tension effects within the ink column. At the point of droplet breakoff, continuous ink jet printers can selectively induce a net charge on the ink droplets so their trajectory toward the recording member can be controlled with an external electric field to either strike the gutter or the paper.

The ink droplets must form at definite distances from the droplet generator so the charging electrodes can be located at the droplet break off point. To control the point of droplet formation so called droplet exciters are used in the ink jet printing art. These exciters set up perturbations or pressure waves in the ink to control both the location of droplet formation and the size of droplets which are formed. U.S. Pat. Nos. 4,282,532 and 4,296,417, both of which were filed June 4, 1979 and have been assigned to the assignee of the present invention, relate to droplet excitation method and apparatus for enhancing droplet formation. The subject matter of both patents concerns thin droplet exciters using polyvinylidene difluoride ($PVF_2$) as the droplet excitation material. The subject matter of those two prior art patents is expressly incorporated in this application by reference. According to the disclosure of these patents, a thin film of $PVF_2$ is positioned against an interior face of a rigid wall of an ink jet fluid chamber and coupled to a source of energization which periodically drives the droplet exciter so as to cause droplet formation at a well defined distance from that generator as ink is squirted from the one or more ink jet orifices in the drop generator. These steps insure that a charging electrode fixed in relation to the generator can induce controlled charges of an appropriate magnitude and polarity on ink droplets as they are formed. While functioning properly at low excitation levels, the operation of thin film $PVF_2$ drivers has yet to be tested with a high speed printer.

As the resolution of the ink jet printer is increased (i.e. the number of ink droplets per inch rises above 200 spots per inch, if the printing speed is to be maintained) the frequency with which ink droplets must be generated also increases. For example, one proposal for ink jet printing with a resolution of 600 spots per inch operates with a droplet generator drive frequency of about 370 KHz. To achieve this high speed, high resolution printing, it is thought to be desirable that no satellite droplets are formed as the ink droplets break off from the ink columns.

Satellite droplets are small ink droplets which form at the time the main ink droplets used for printing are generated. These satellite droplets must merge with the main droplets prior to contact with the print medium or the satellite droplets would form their own individual printed regions on the paper that would degrade image quality. For low resolution, low speed printing, the satellites present no problem since they merge prior to striking the paper. For high speed printing, however, the satellite droplet formation should be avoided and one way of doing so is to increase the drive level or perturbation provided by the droplet excitation member.

$PVF_2$ is not an efficient enough driver to provide the needed perturbation at low excitation voltage levels and to excite $PVF_2$ strongly enough to avoid satellite formation would require application of a signal which would exceed the breakdown strength of $PVF_2$. Theoretical calculations also indicate that even if the $PVF_2$ could withstand the additional drive signal, so much heat would be dissipated during printer operation that special steps would need to be taken to assure uniform performance as that heat is added to the printing system. When the drive level of any droplet exciter is increased to avoid satellite formation, the energy dissipation in the form of heat rises as a quadratic function of the drive voltage. Energy dissipation in the form of heat generation in the ink can change the point of droplet formation thereby exacerbating the problem the droplet exciter was used to solve.

The perceived difficulties with $PVF_2$ drive materials have suggested other drivers be examined. In particular, a material which exhibits stronger piezoelectric activity at excitation levels lower than the breakdown field of the material is advised. Certain ceramics exhibit high piezoelectric activity and have been tested as droplet exciters with some success. The major problems associated with the use of ceramic drivers are that they are brittle and thus prone to breakage during handling and that large area flat sheets of ceramic piezoelectrics are extremely difficult to fabricate. Abutting smaller ceramic plates is unattractive because, again, the brittle ceramic must be handled and because the edge surfaces can lead to high dielectric losses (and a concomitant heating problem) and to low dielectric breakdown strength. For these reasons, improved droplet drivers having the requisite drive capabilities and areas are one goal not yet satisfactorily achieved in the ink jet printing art.

SUMMARY OF THE INVENTION

The disadvantageous operating characteristics noted above with regard to the prior art exciters have been addressed by use of drive members or exciters having combinations of piezoelectric activities, dielectric losses, and dielectric breakdown strengths which allow the desired degree of excitation while being producible in large area sheets.

According to the invention, the drive member for generating pressure waves in an ink jet generator includes multiple particles of a first ceramic material supported or embedded in a second support or matrix material. The resulting composite exhibits piezoelectric characteristics when poled with an electric field of sufficient strength. The combination gives the drive member energy conversion characteristics of a piezoelectric member which, though different from a pure ceramic piezoelectric, still exhibits sufficient piezoelectric drive to be used as an ink jet driver.

According to a preferred embodiment of the invention, the ceramic material comprises individual lead zirconate-titanate (PZT) particles embedded in a polymeric material, such as polyethylene, to obtain a composite structure which, when poled, exhibits sufficient piezoelectric characteristics, yet is readily fabricated into members of sufficient size to serve as ink droplet exciters. The polyethylene material binds together the piezoelectric material in a compliant structure. The composite structure exhibits piezoelectric drive characteristics less efficient than a material composed purely of PZT, but, unlike the PZT material, the composite is not brittle so not easily damaged during fabrication and/or mounting. The composite can be made as a large area structure which experiences relatively low dielectric energy losses at the excitation frequencies at which the droplet exciter must be driven.

A preferred technique for creating the composite drive material comprises a layering techique, wherein alternate layers of ceramic and polymeric material are combined and then fused during a pressure and heat treating step. Specifically, according to a preferred fabrication technique, a polymeric layer of polyethylene or the like having a thickness of approximately 3.6 mils is sprinkled with a layer of 7 mil diameter PZT particles and then sandwiched with another 3.6 mil polyethylene layer. The alternating layers can be repeated as many times as desired to obtain the appropriate thickness driver. The layered configuration is then heated at a pressure sufficient to cause the polymeric material to fill inter-particle spacings between the ceramic particles to form a composite driver material which is readily manufacturable into desirable shapes and sizes.

An alternate fabrication technique uses ceramics having a smaller particle diameter. These small diameter particles are combined in a controlled ratio with a matrix polymer powder. The mixture is then heat and pressure treated to form a solid composite which again exhibits the proper drive characteristics for a ink drop exciter.

From the above, it should be appreciated that one object of the present invention is to provide a composite ink jet drive member exhibiting piezoelectric characteristics sufficiently large to function as an efficient energy conversion member without undue energy loss in the form of heat. The second feature achieved by practice of the invention is an easily manufacturable large area drive member having the above characteristics. Other objects, features and advantages of the invention will become clear when a detailed description of a preferred embodiment of the invention is considered in conjunction with the accompanying drawings.

DETAILED DESCRIPTION OF THE PREFERRED EMBODIMENT

Figure 1:
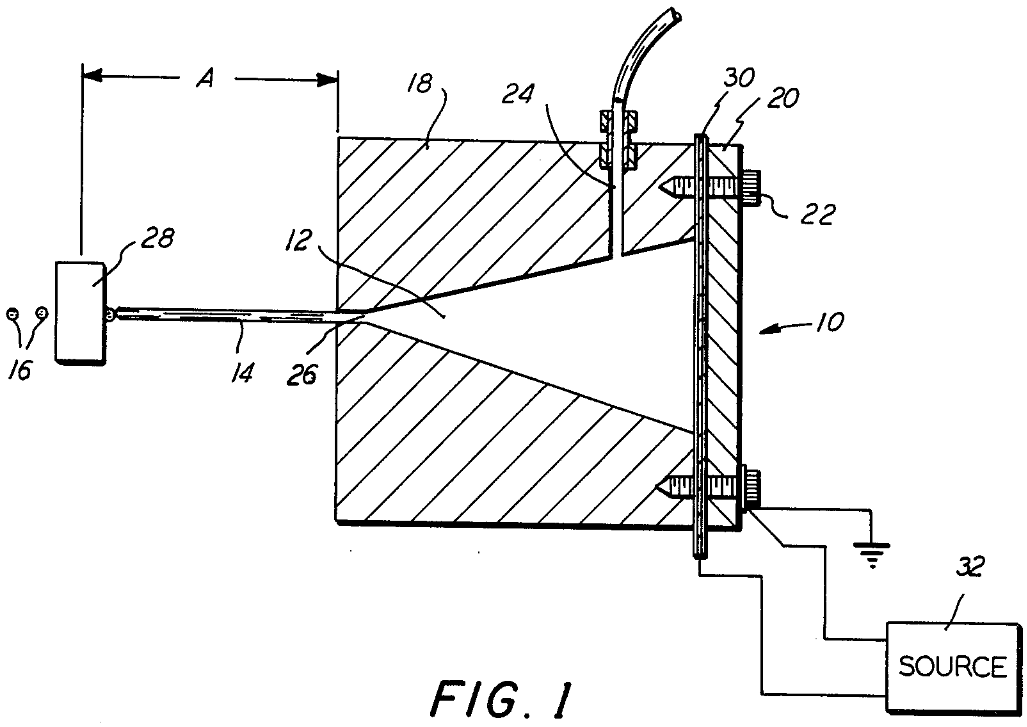
FIG. 1 is an elevation view of an ink jet droplet generator including a droplet exciter.

Turning now to the drawings, particularly FIG. 1, there is illustrated an ink jet droplet generator 10 defining a cavity 12 from which a stream 14 of ink is ejected under pressure to break up into individual ink droplets 16 for ink jet printing. The generator 10 comprises a generator block 18 which defines the shape of the cavity 12 and a backplate 20 connected to the block 18 with suitable connectors 22. A fluid conduit 24 is coupled to a source (not shown) of ink and transmits ink from that source through the conduit to the ink cavity. As ink is squirted through the one or more orifices 26 defined by the block 18, the ink column or columns 14 break up in to individual droplets 16 at a well defined distance A from those one or more nozzles 26.

In continuous ink jet printing the trajectory of individual droplets is controlled by selectively placing a net charge on certain droplets at the point of droplet formation. In this type of printing, therefore, it is necessary that a charging electrode 28 be mounted in close proximity to the point of droplet break off. Subsequent to the charging step, the ink droplets are directed through a deflecting plate (not shown) so that certain ones of the droplets can be deflected away from their initial trajectory to a droplet gutter for recirculating back to the cavity 12 and certain other droplets strike a print medium at controlled locations to encode that medium with information. It is vital to the functioning of a continuous type ink jet printer that the droplet break-off point be controllable so that the charging electrode 28 performs the function of inducing a net charge on certain ones of the droplets.

To insure the columns 14 break up into individual droplets next to the charging electrode 28, pressure waves are set up inside the cavity 12 by a droplet exciter 30. According to the design disclosed in FIG. 1, the exciter 30 is attached to the backplate 20 and is fixed in relation to the generator 10 by the same connectors 22 used to mount the backplate 20. The exciter 30 may be adhesively bonded with a suitable adhesive such as an epoxy or directly bonded by hot pressing the exciter to the backplate 20. The exciter 30 preferably comprises a piezoelectric material for converting electrical signals into mechanical energy which in turn sets up pressure waves inside the cavity 12. Piezoelectric materials are known in the art and the practice of coupling these materials to suitable electrical sources, such as the source 32 shown in FIG. 1, are also known in the art.

Details regarding the physical dimensions of the cavity 12 found suitable for an ink jet droplet generator design may be obtained by reference to U.S. Pat. Nos. 4,282,532 and 4,296,417 which were incorporated by reference above. The physical dimensions of the droplet exciter 30 will vary depending upon the system architecture. It should be appreciated, therefore, that, if the generator 10 simultaneously creates a series of parallel droplet streams, the exciter 30 will extend a significant distance along the back dimension of the generator, so that one exciter generates pressure waves for all droplet streams. Thus, a typical exciter 30 may extend along an entire print plane equal to the width dimension of the print medium. The previously referenced two U.S. patents both incorporate a $PVF_2$ droplet exciter material in the exciter 30. This material has been advantageous from a manufacturing standpoint since it is piezoelectrically active and can be manufactured and handled in sizes large enough to allow uniform droplet exitation for multiple droplet streams by a single exciter.

As noted above, however, the $PVF_2$ droplet exciter material may be inadequate for providing droplet excitation in a high resolution, high frequency ink jet printer. In particular, the no satellite condition taxes the exciter capability of a $PVF_2$ member and can conceivably degrade the system operation by adding an additional variable in the form of heat dissipation into the printing system.

Figure 2:
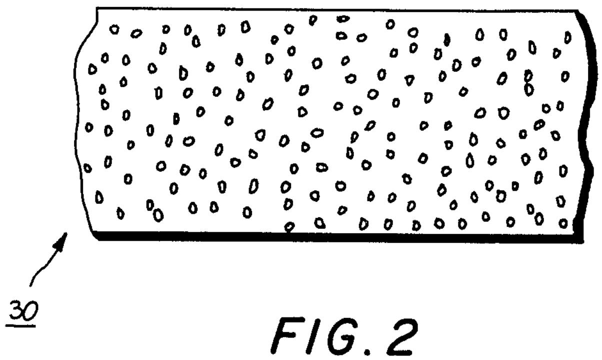
FIGS. 2–4 are enlarged cross sectional views of suitable piezoelectric structures for the FIG. 1 droplet exciter.
Figure 3:
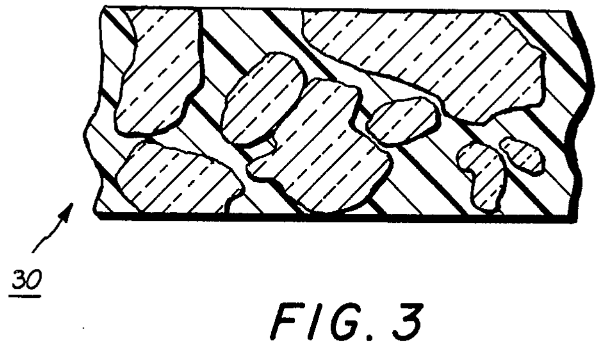
Figure 4:
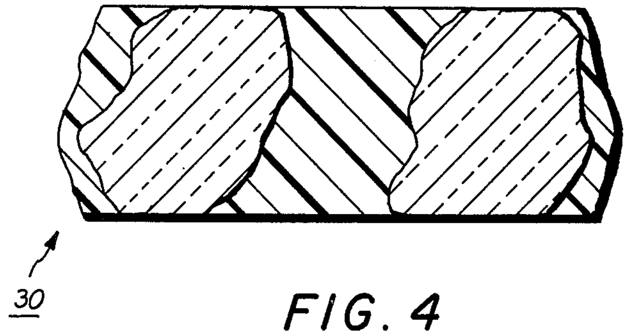

FIGS. 2–4 show alternate exciter members 30 constructed in accordance with the present invention. Each exciter 30 comprises a first ceramic material supported by a polymeric material to form a composite exciter. The three figures display three different diameter ranges (relative to the total film the thickness) for the ceramic material.

EXAMPLE 1

The small particle composite (FIG. 2) was constructed with small diameter ceramic particles suspended in a matrix of polymeric material. In the small particle example, the ceramic particles had a diameter on the order of 1.5 microns and the composite has a thickness of approximately 10 mils. The small particle exciter was constructed by mixing together ceramic particles of an appropriate dimension (1.5 microns) with a powder of the matrix material, so that the ceramic material formed a controlled percentage by volume of the mixture. The mixture was then pressure treated at an elevated temperature to form a composite solid of approximately 10 mil thickness. This composite material was electroded and then poled by connecting a source of constant voltage across its thickness. The poling process reorients internal electric dipoles in the ceramic particles imparting piezoelectric properties to the composite. The ceramic material used was an electrically soft lead zironate-lead titanate (PZT) solid solution composition and the matrix material was polyethylene. Composites of this type, containing 45% PZT by volume, exhibit piezoelectric response comparable to that of $PVF_2$ in the longitudinal direction when poled to saturation with fields of approximately 500 volts per mil.

EXAMPLE 2

An intermediate sized PZT composite was constructed wherein much larger sized PZT particles were imbedded in a polyethylene matrix. The thickness of this composite was also about 10 to 12 mils, but the PZT materials have an average diameter of 7 mils. The intermediate sized PZT particles were mixed with a powder polyethylene material as was done in the fabrication of the small particle composites. The mixture was then pressure and heat treated to form the appropriate thickness (10–12 mil) composite. Use of the intermediate size ceramic reduced the poling potentials necessary to produce the necessary piezoelectric response from the composite.

EXAMPLE 3

Figure 5:
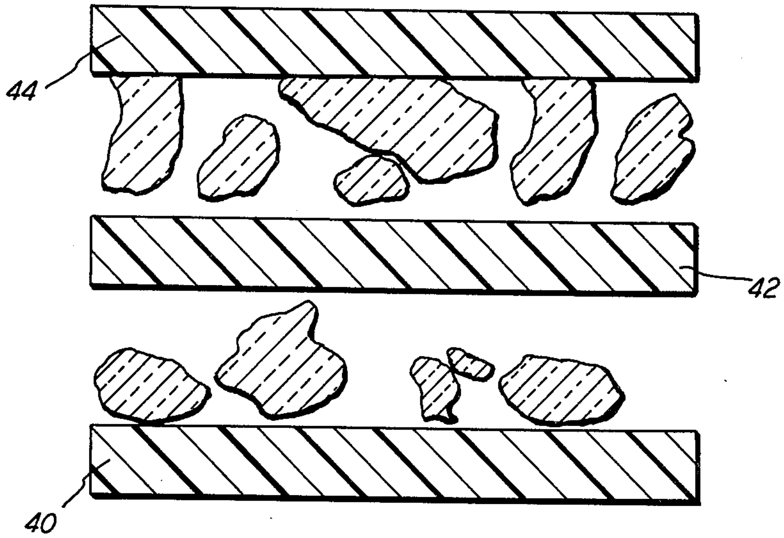
FIG. 5 is a side view showing layers of ceramic and polymeric materials before being pressure and heat treated to form the FIG. 3 exciter.

An intermediate particle composition (FIG. 3) was formed to achieve a less homogeneous mix between ceramic and matrix material. With this end in mind, a fabrication approach was employed (FIG. 5) in which a sandwich of PZT and polyethylene material is formed before pressure and heat treating. According to this fabrication technique, a 3.6 mil polyethylene sheet 40 formed an initial substrate onto which 7 mil diameter particles of PZT were sprinkled. These particles were then covered with another polyethylene sheet 42 of similar dimension to the first (3.6 mil) and more particles of PZT sprinked onto that second sheet. Finally, a third sheet 44 of polyethylene material was applied to cover the second layer of PZT particles and the resulting sandwich was pressed at approximately 170° Celsius with a pressure on the order of 1500 pounds per square inch. The two surfaces of the resulting structure were then abraded so that the structure had a thickness of about 10 to 12 mils. Electrodes were then attached and the PZT material poled to produce a piezoelectric response from the composite. The intermediate particle composite requires a poling field an order of magnitude less than the small particle composite to achieve saturation poling.

The electrical permittivity of the Example 3 (layered) samples was greater than the Example 2 (mixed) samples. When electrodes are applied to the composite driver, the strength of the poling potentials needed to provide saturation poling depends on the permittivity of the sample. Composities of Example 3 have higher permittivities than composites of Example 2 for the same volume percent PZT. The increase in permittivity arises from the fact that more (high permittivity) ceramic is continuously connected between the electroded surfaces and thus will experience a higher fraction of the electric field applied during poling. For low loadings of ceramic (less than about 35% by volume) in the first three examples, the polymer and ceramic are effectively in series and it becomes difficult to apply a field which is sufficient for saturation poling of the ceramic. High loading of the polymers with ceramic allows particle-to-particle contact through the sheet thickness resulting in the advantages of parallel connectivity of the constituent phases. Larger ceramic particles allow more effective particle contact through the thickness of the sheet and the fabrication method in Example 3 is very effective because the particles are pressed into contact in the desirable direction. In Examples 1 and 2 the materials are more homogeneously distributed and the number of straight through, high permittivity ceramic paths is less than in Example 3.

EXAMPLE 4

FIG. 4 shows a so called large particle composite wherein the PZT material initially had a diameter greater than the desired dimension of the ink jet exciter 30. The fabrication technique for this large particle composite was similar to the second technique for the intermediate particle composite in that large diameter PZT particles were pressed into a film of polyethylene material. The surfaces were then abraded to an appropriate thickness such that the PZT particles extended across the entire thickness dimension of the driver. The large particle composite was more advantageous from a poling standpoint since even smaller electric fields were used to treat the composite material in order to achieve a piezoelectric response from that material.

Suitable ceramic substitutes could be another PZT composition or another piezoelectric ceramic such as barium titanate. Alternative thermoplastic matrix polymers are, for example, $PVF_2$, polypropylene, and polyurethane. Other types of polymer might also be used as matrix materials, for example, silicone rubber or an epoxy. Alternative composite fabrication techniques such as doctor blading would be used in these instances since these materials are not thermoplastic. The PZT composition was chosen for its high piezoelectric response and ease of poling while polyethylene was used for its high dielectric breakdown strength, chemical resistance, and thermoplasticity.

Exciters 30 have been constructed using various ceramic concentrations and in particular ink droplet exciters having percentage by volume of ceramic between 30 and 50% have been used. The PZT 501A material used in fabricating the above exciters was obtained from Ultrasonic Powders Inc., 2383 S. Clinton Avenue South, Plainfield, N.J. 07080. More information regarding piezoelectric composites as well as piezoelectricity may be obtained in the following references which are incorporated herein by reference.

1. "Piezoelectric Properties in the Composite Systems of Polymer and PZT Ceramics" by Furukawa, Ishida, and Fukada; Journal of Applied Physics 50(7); July 1979.

2. "Polypropylene Filled with Barium Titanate: Dielectric and Mechanical Properties" by S. Dasgupta; Journal of Applied Polymer Science; Vol. 22; pages 2283–2286 (1978).

3. "Flexible Piezoelectric Organic Composites" by W. B. Harrison; Proceedings of the Workshop on Sonar Transducer Materials, Navel Research Laboratories; p. 257; November 1975.

4. *Piezoelectricity;* Cady, 1946; McGraw-Hill; New York.

5. "Piezoelectric Ceramics," Jaffe, Cook, and Jaffe,; Vol. 3 of *Non-Metallic Solids;* Roberts and Popper eds; 1971; Academic Press; London and New York.

Testing of small, intermediate, and large particle composite drivers indicates use of these devices provides greater droplet excitation efficiencies than prior art exciters comprising polyvinylidene difluoride ($PVF_2$). The small particle composites of Example 1 can be poled in much greater thicknesses than $PVF_2$. This fact, coupled with their high dielectric breakdown strength, means that a much higher drive voltage can be applied to such materials without danger of breakdown, resulting in correspondingly higher acoustic drive capability. Also, because the dielectric losses are much lower than those of $PVF_2$ in the composites of Example 1, the energy dissipation in the form of heat lost to the printing system is much reduced so that specific steps need not be taken to avoid printing variation due to heat transfer from the driver to the ink.

Composite drivers of the types described in Examples 2 and 3 show stronger piezoelectric activity than $PVF_2$ and the composite of Example 1. This fact allows operation of these drivers at reduced fields. Although dielectric breakdown strengths are lower in these types of composites and dielectric losses are intermediate to $PVF_2$ and Example 1 composites, the reduction in the magnitude of the drive field necessary for achieving the no-satellite condition allows operation of a generator 10 at fields significantly lower than breakdown and at an energy dissipation level which is less than that of $PVF_2$ driven generators.

Laboratory tests demonstrate drive level increases of a factor of six over $PVF_2$ are possible with the type of composite in Example 3. The drive capability of composites formed as described in Example 2 is less than that of Example 3 but has been shown effective in both laboratory testing and in a drop generator 10. A composite of the Example 2 type exhibits about twice the activity of a $PVF_2$ driver and the drive voltage necessary to achieve no satellite drive is found to be correspondingly reduced by about a factor of two in drop generator testing.

The composites of Example 4 can exhibit very high drive levels (large fractions of the capability of PZT itself) which depend approximately on the ratio of the exposed area of the ceramic phase to the area of the composite sheet. Since the necessary applied voltage level to achieve no-satillite operation is again reduced, the advantages as described above for the other composites also obtain.

As disclosed above, the composite exciter method and apparatus of the present invention can be fabricated using a variety of techniques and a range of ceramic and polymer materials. It is the intent, therefore, that all modifications and/or changes falling within the spirit or scope of the appended claims be protected by the present application.

I claim:

1. A method of fabricating a composite ink jet drive member comprising the steps of:

forming a planar base layer of polymeric material;

applying a first, substantially uniformly thick layer of discrete particles of piezoelectric ceramic material to said base layer;

covering said first layer of ceramic particles with a second planar layer of polymeric material to form a sandwich of ceramic particles between layers of polymeric material;

exerting a pressure on said sandwich of ceramic particles at an elevated temperature to form a composite drive member having two outer surfaces, so that said layers of polymeric material are squeezed towards each other to fill interstices between said ceramic particles while concurrently causing the ceramic particles to be continuously connected throughout the thickness of the composite drive member in the direction that the pressure is applied, said ceramic particles adjacent the outer surfaces of the composite drive member having surface portions which extend through the polymeric material for electrical contact at the outer surfaces of the composite drive member; and poling said composite drive member with an electric field to cause a piezoelectric response therefrom.

2. The method of claim 1, which further comprises the steps of:

bonding by hot pressing the composite drive member directly to a back mounting plate of an ink droplet generator, so that the need for an adhesive or other attaching means is avoided.

3. The method of claim 1 which further comprises the steps of:

applying a second, substantially uniformly thick layer of said ceramic particles to said second planar layer of polymeric material; and covering said second layer of ceramic particles with a third planar layer of polymeric material to from a sandwich having two layers ceramic particles between three layers of polymeric material prior to exerting the pressure step at an elevated temperature.

4. The method of claim 3, wherein the ceramic particles are PZT and have an average diameter of 7 mils; wherein the planar layer of polymeric material are 3.6 mil thick polyethylene sheets; wherein the pressure exerted is about 1500 pounds per square inch and the elevated temperature is 170° celsius; wherein the portion of ceramic particles in the composite drive member is greater than 35% by volume; and wherein the method further comprises the step of:

abrading the outer surfaces of the composite drive member, so that the thickness thereof is between 10 and 12 mils.

5. The method of claim 1, wherein the ceramic particles are PZT and have an average diameter greater than the desired thickness of the composite drive member; wherein the planar layer of polymeric material is 3.6 mil thick polyethylene sheets; and wherein the method further comprises the steps of:

abrading the composite drive member to the desired thickness, so that the PZT particles extend across the entire thickness dimension of the composite drive member which enables the use of smaller electric poling fields to achieve piezoelectric response therefrom.

6. A method for fabricating a composite ink jet droplet drive member comprising the steps of:

mixing particles of a ceramic piezoelectric material with a polymeric powder to form a combination having a range of percentage by volume of ceramic material of between 30 and 50 percent;

pressing the combination at an elevated temperature to melt the powder and to form a composite film, so that the ceramic particles are continuously connected across the entire thickness of the film and surface portions of the ceramic particles are exposed at the surfaces of the composite film; and poling said film to cause said film to respond as a piezoelectric composite drive member when energized with an electric field.

7. The method of claim 6, wherein the ceramic particles are PZT and have an average diameter of 1.5 microns; wherein the polymeric powder is polyethylene; wherein the film thickness is 10 mils; and wherein the film contains 45% PZT by volume.

8. The method of claim 6, wherein the ceramic particles are PZT and have an average diameter of 7 mils; wherein the polymeric powder is polyethylene; and wherein film thickness is between 10 and 12 mils.

* * * * *